(12) United States Patent
Koga et al.

(10) Patent No.: US 7,095,565 B2
(45) Date of Patent: Aug. 22, 2006

(54) ZOOM LENS UNIT AND IMAGE PICKUP APPARATUS

(75) Inventors: Akihiro Koga, Kawasaki (JP); Yasuo Shima, Kawasaki (JP); Toshikatsu Akiba, Kisarazu (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 11/230,488

(22) Filed: Sep. 21, 2005

(65) Prior Publication Data

US 2006/0066959 A1 Mar. 30, 2006

(30) Foreign Application Priority Data

Sep. 24, 2004 (JP) .............................. 2004-278272

(51) Int. Cl.
| | |
|---|---|
| G02B 15/14 | (2006.01) |
| G02B 7/02 | (2006.01) |
| G02B 13/16 | (2006.01) |
| G03B 17/00 | (2006.01) |
| G03B 3/10 | (2006.01) |
| H02K 41/00 | (2006.01) |
| H02N 1/00 | (2006.01) |
| H04N 5/225 | (2006.01) |
| H01L 27/148 | (2006.01) |

(52) U.S. Cl. ...................... 359/694; 359/696; 359/823; 396/87; 396/133; 310/12; 310/309; 348/335; 348/374; 257/232

(58) Field of Classification Search ................ 359/694, 359/696, 697, 819, 822, 823; 310/12, 309; 348/335, 374, 303, 304; 396/133, 75, 87; 257/232, 233

See application file for complete search history.

(56) References Cited

U.S. PATENT DOCUMENTS

| | | | |
|---|---|---|---|
| 6,611,079 B1 | 8/2003 | Koga et al. | |
| 6,670,738 B1 | 12/2003 | Kasahara et al. | |
| 6,680,558 B1 | 1/2004 | Akiba et al. | |
| 6,717,326 B1 | 4/2004 | Koga et al. | |
| 6,750,591 B1 | 6/2004 | Akiba et al. | |
| 6,765,332 B1 | 7/2004 | Akiba | |
| 6,774,534 B1 | 8/2004 | Akiba et al. | |
| 6,781,281 B1 | 8/2004 | Koga et al. | |
| 6,784,594 B1 | 8/2004 | Kasahara et al. | |

(Continued)

FOREIGN PATENT DOCUMENTS

EP 1 193 853 A2 4/2002

(Continued)

OTHER PUBLICATIONS

Akihiro Koga, et al., "Electrostatic Linear Mircoactuator Mechanism For Focusing a CCD Camera", Reprinted from IEEE Journal of Lightwave Technology, vol. 17, No. 1, Jan. 1999, pp. 43-47 and 2 cover pages.

*Primary Examiner*—Loha Ben
*Assistant Examiner*—Jack Dinh
(74) *Attorney, Agent, or Firm*—Oblon, Spivak, McClelland, Maier & Neustadt, P.C.

(57) ABSTRACT

In a zoom lens unit, substrate are arranged to be faced to each other and are provided with first driving electrodes used to drive a first movable section and second driving electrodes used to drive a second movable section, respectively. A recessed portion is formed in the first movable section so as to face the second driving electrodes. A recessed portion is also formed in the second movable section so as to face the first driving electrodes. The first and second movable sections can be independently controlled to achieve a zoom operation.

18 Claims, 12 Drawing Sheets

U.S. PATENT DOCUMENTS

| | | |
|---|---|---|
| 6,806,618 B1 | 10/2004 | Koga et al. |
| 6,806,661 B1 | 10/2004 | Kasahara et al. |
| 6,900,576 B1 | 5/2005 | Koga et al. |
| 6,924,940 B1 | 8/2005 | Koga et al. |
| 2004/0057802 A1 | 3/2004 | Flolo |
| 2004/0119870 A1 | 6/2004 | Yoshida et al. |
| 2004/0130639 A1 | 7/2004 | Koga et al. |
| 2004/0130802 A1 | 7/2004 | Koga et al. |

FOREIGN PATENT DOCUMENTS

| | | |
|---|---|---|
| JP | 2004-126009 | 4/2004 |

Quadratic approximation

Tertiary approximation

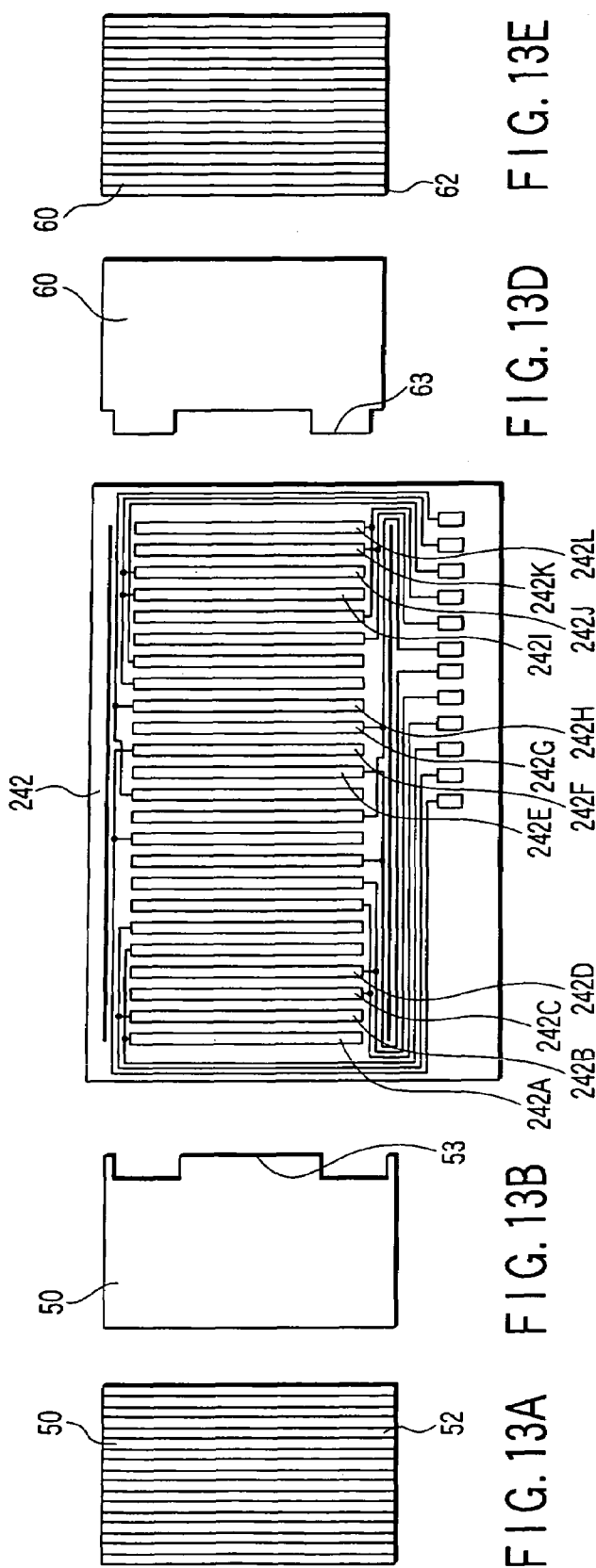

ZOOM LENS UNIT AND IMAGE PICKUP APPARATUS

CROSS-REFERENCE TO RELATED APPLICATIONS

This application is based upon and claims the benefit of priority from prior Japanese Patent Application No. 2004-278272, filed Sep. 24, 2004, the entire contents of which are incorporated herein by reference.

BACKGROUND OF THE INVENTION

1. Field of the Invention

The present invention relates to a zoom lens unit and an image pickup apparatus which utilize an electrostatic actuator to drive a lens, and in particular, to a zoom lens unit and an image pickup apparatus which utilize an electrostatic actuator independently controlling and driving individual movable sections in which lenses are provided.

2. Description of the Related Art

In recent years, many efforts have been made to incorporate a camera unit with a zoom function into a mobile apparatus such as a cellular phone. In such a camera unit, a lens is driven along an optical axis to adjust a focus to finally form an image on a sensor. Attempts have been made to use an electrostatic actuator as a driving source that drives the lens across the optical axis.

In a zoom lens unit, lenses are independently driven to adjust the zoom scale factor of a lens system. In a zoom lens unit utilizing an electrostatic actuator, the electrostatic actuator comprises a stator and first and second movable sections. The first and second movable sections hold the respective lenses and are independently driven.

The stator comprises a driving electrode substrate and a holding electrode substrate mounted on the opposite inner surfaces of a stator frame. Further, the first and second movable sections are arranged so that there is a gap of several μm between each movable section and the corresponding one of the paired electrode substrates. The first and second movable sections are reciprocated between the paired electrode substrates and also moved along the axial direction of the lenses. The holding electrode substrate is provided with a first holding electrode used to hold the first movable section and a second holding electrode used to hold the second movable section.

A zoom lens unit configured as described above is disclosed in Jpn. Pat. Appln. KOKAI Publication No. 2004-126009 and the corresponding U.S. patent application Ser. No. 10/672,409, filed Sep. 29, 2003, Koga et al. In these documents, the first and second movable sections are electrostatically driven by using as switching circuit to supply voltages to the electrodes of the paired electrode substrates of the stator in a predetermined order. In the conventional zoom lens unit, with one of the movable sections held by the holding electrode substrate, voltages are supplied to the driving electrode substrate in a predetermined order to drive the other movable section. Thus, the conventional zoom lens unit can only alternately move the plurality of movable sections.

In the zoom lens unit, to change the zoom scale factor, each lens must trace a zoom curve based on a particular lens design. If the zoom curve is traced, it is not preferable that lenses from different groups be alternately driven. Alternately driving the lenses unavoidably causes the positions of a plurality of movable sections to be temporarily shifted from the zoom curve. That is, a subject gets out of focus during the zoom operation, resulting in a blurred image.

BRIEF SUMMARY OF THE INVENTION

It is an object of the present invention to provide a zoom lens unit that hinders the subject from getting out of focus during a zoom operation as well as an image pickup apparatus comprising the zoom lens unit.

According to an aspect of the present invention, there is provided a zoom lens unit comprising:

a stator frame;

a first movable section having a first recessed portion and received in the stator frame, which is guided in the stator frame so as to be movable along a predetermined direction;

a second movable section having a second recessed portion and received in the stator frame, which is guided in the stator frame so as to be movable along the predetermined direction independent from a movement of the first movable section;

first and second lenses mounted on the first and second movable sections, respectively, an image of a subject being transferred by the first and second lenses;

first and second substrates arranged in the stator frame so as to be faced each other;

a first holding electrode provided on the first substrate to attract and hold the first movable section;

a second holding electrode provided on the first substrate to attract and hold the second movable section;

first driving electrodes provided on the second substrate at a predetermined pitch in the predetermined direction so as to drive the first movable section, the first driving electrodes being arranged to face the second recessed portion; and second driving electrodes provided on the second substrate at a predetermined pitch in the predetermined direction so as to drive the second movable section, the second driving electrodes being electrically separated from the first driving electrodes and being arranged to face the first recessed portion.

According to another aspect of the present invention, there is provided a zoom lens unit comprising:

a stator frame;

a first movable section having a first recessed portion and received in the stator frame, which is guided in the stator frame so as to be movable along a predetermined direction;

a second movable section having a second recessed portion and received in the stator frame, which is guided in the stator frame so as to be movable along the predetermined direction independent from a movement of the first movable section;

first and second lenses mounted on the first and second movable sections, respectively, an image of a subject being transferred by the first and second lenses;

first and second substrates arranged in the stator frame so as to be faced each other;

a first holding electrode provided on the first substrate to attract and hold the second movable section;

a second holding electrode provided on the second substrate to attract and hold the first movable section;

first driving electrodes provided on the second substrate at a predetermined pitch in the predetermined direction so as to drive the second movable section, the first driving electrodes being electrically separated from the second holding electrode and being arranged to face the first recessed portions; and second driving electrodes provided on the first substrate at a predetermined pitch in the predetermined direction so as to drive the first movable section, the second driving electrodes being electrically separated from the first holding electrodes and being arranged to face the second recessed portions.

According to another aspect of the present invention, there is provided a zoom lens unit comprising:

a stator frame;

a first movable section received in the stator frame, which is guided in the stator frame so as to be movable in a predetermined direction;

a second movable section received in the stator frame, which is guided in the stator frame so as to be movable in the predetermined direction independently of the first movable section;

first and second lenses mounted on the first and second movable sections, respectively, an image of a subject being transferred by the first and second lenses;

first and second substrates arranged in the stator frame so as to be faced each other, the second substrate having a surface including first, second and third areas, the first area is defined in a range within which the first movable section moves, the second area is defined in a range within which the second movable section moves, and the third area is defined between the first and second areas in a range within which the first and second movable sections are movable, respectively;

a first holding electrode provided on the first substrate so as to attract and hold the first movable section;

a second holding electrode provided on the first substrate so as to attract and hold the second movable section, the second holding electrode being electrically separated from the first holding electrode;

first driving electrodes provided in the first area of the second substrate at a predetermined pitch in the predetermined direction so as to drive the first movable section;

second driving electrodes provided in the second area of the second substrate at a predetermined pitch in the predetermined direction so as to drive the second movable section, the second driving electrodes being electrically separated from the first driving electrodes; and third driving electrodes provided in the third area of the second substrate at a predetermined pitch in the predetermined direction so as to selectively drive the first and second movable sections, the third driving electrodes being electrically separated from the first and second driving electrodes.

BRIEF DESCRIPTION OF THE SEVERAL VIEWS OF THE DRAWING

FIGS. 13A and 13B are plan views schematically showing a top surface and a front surface of a first movable section in a zoom lens unit according to a third embodiment of the present invention;

FIG. 13C is a plan view schematically showing an arrangement of electrodes on an inner top surface of a stator in the zoom lens unit according to the third embodiment of the present invention;

FIGS. 13D and 13E are plan views schematically showing a front surface and a top surface of a second movable section in the zoom lens unit according to the third embodiment of the present invention;

DETAILED DESCRIPTION OF THE INVENTION

With reference to the drawings, description will be given of a zoom lens unit and an image pickup apparatus according to embodiments of the present invention.

(First Embodiment)

Figure 1:
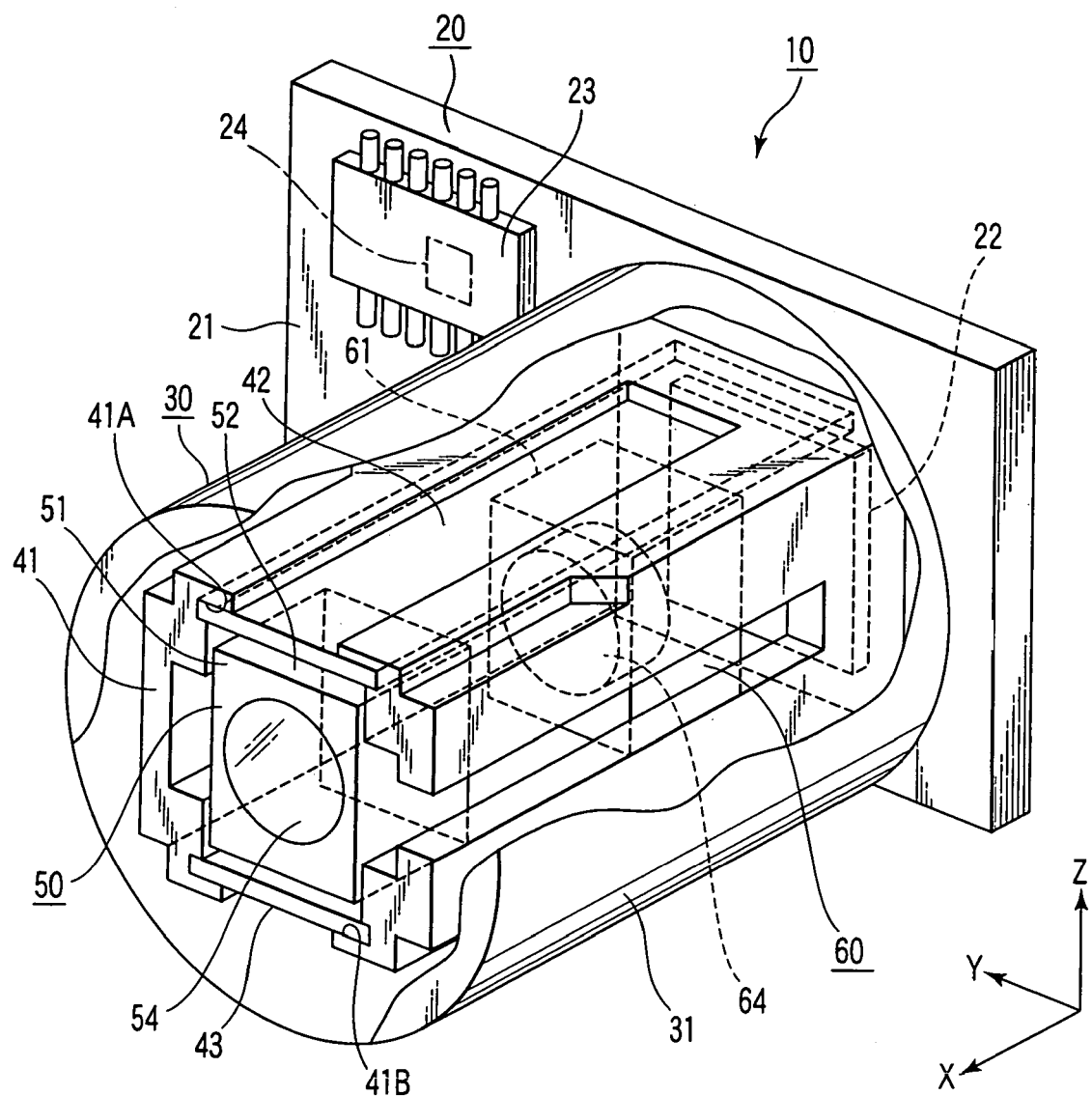
FIG. 1 is a perspective view schematically showing an image pickup apparatus comprising a zoom lens unit according to a first embodiment of the present invention.
Figure 2:
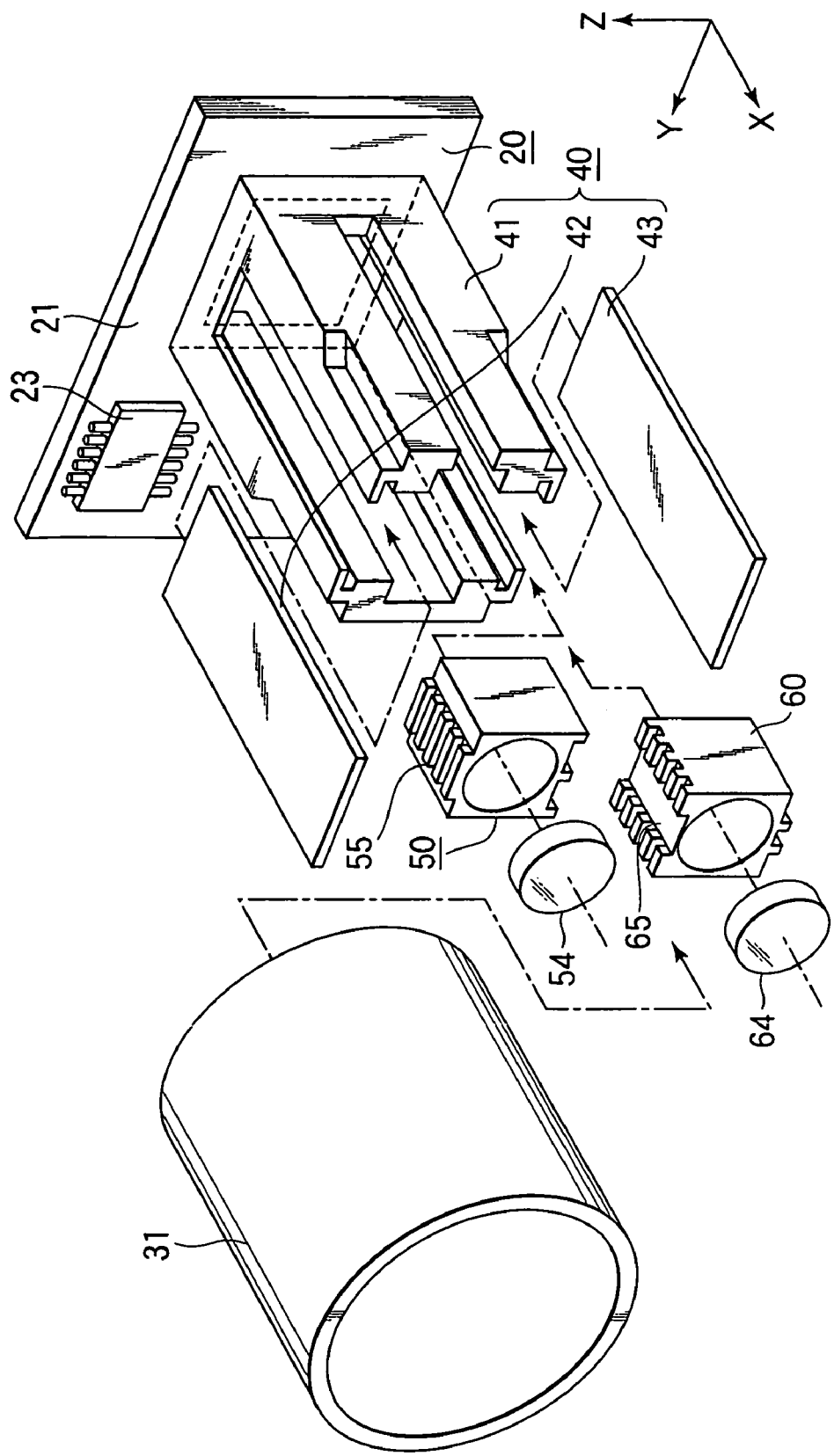
FIG. 2 is an exploded perspective view schematically showing the image pickup apparatus shown in FIG. 1.
Figure 3:
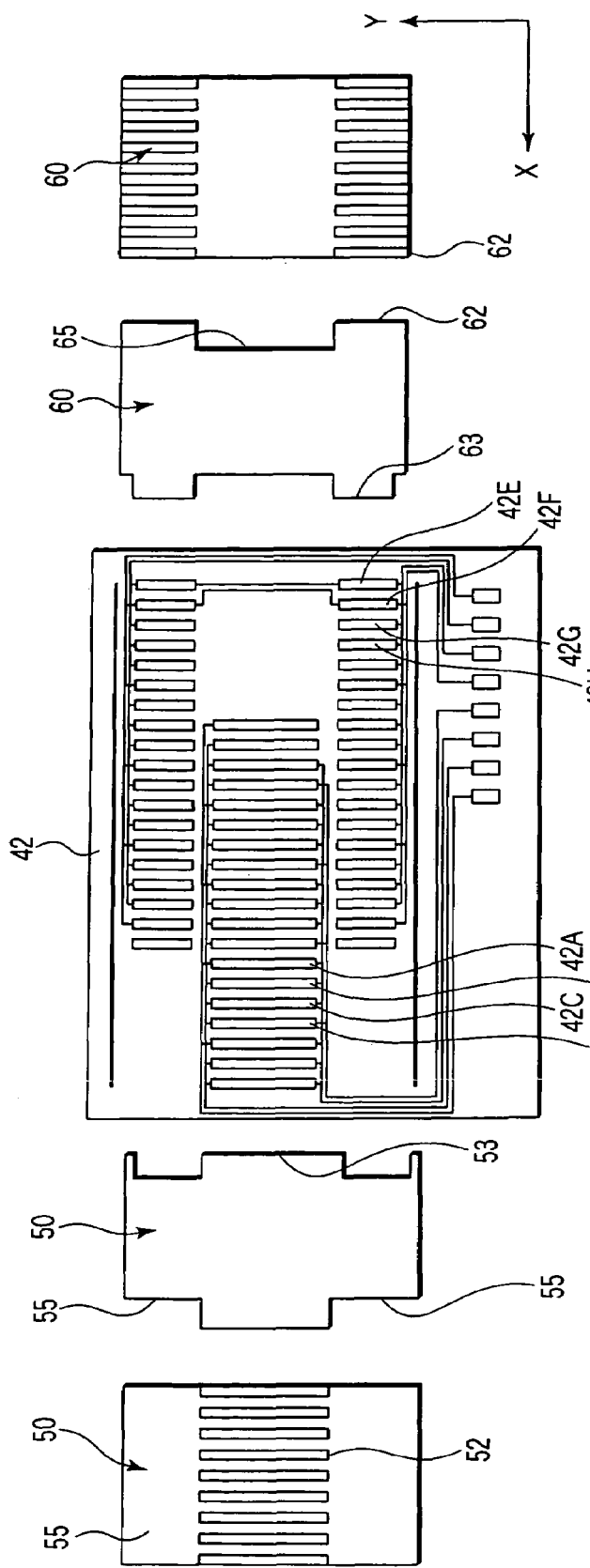
FIGS. 3A and 3B are a plan view and a front view schematically showing a top surface and a side surface, respectively, of a first movable section of the zoom lens unit shown in FIG. 1.
FIG. 3C is a plan view schematically showing an arrangement of electrodes on an inner top surface of a stator in the zoom lens unit shown in FIG. 1.
FIGS. 3D and 3E are plan views schematically showing a front surface and a top surface, respectively, of a second movable section of the zoom lens unit shown in FIG. 1.
Figure 4:
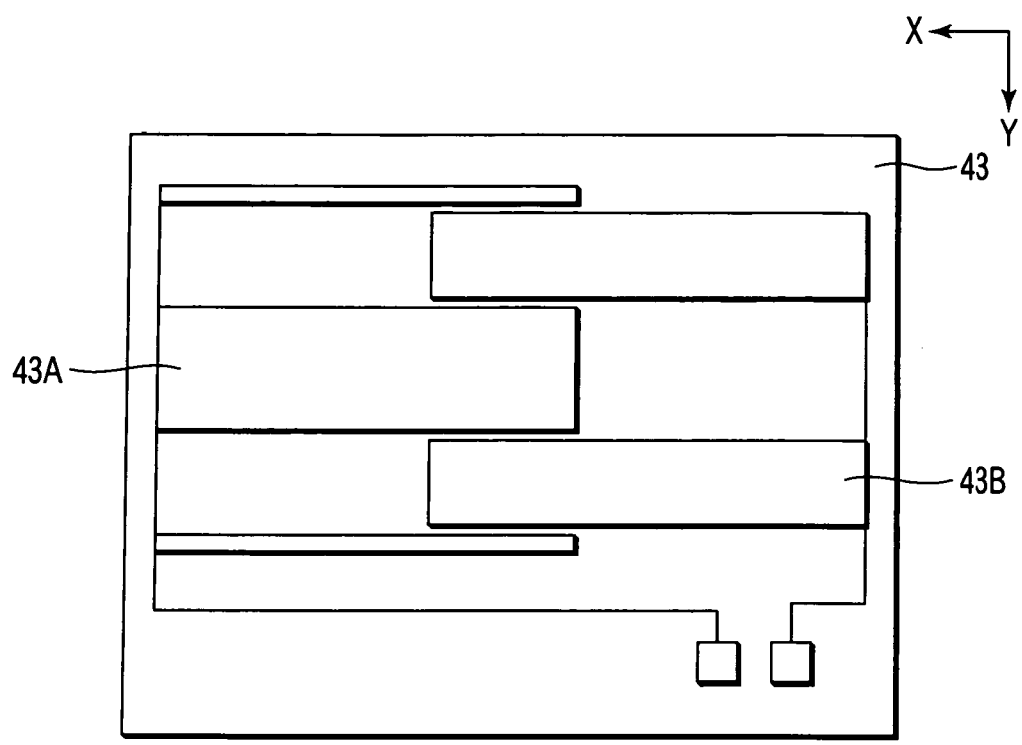
FIG. 4 is a plan view schematically showing an arrangement of electrodes on an inner bottom surface of a stator in the zoom lens unit shown in FIG. 1.
Figure 5:
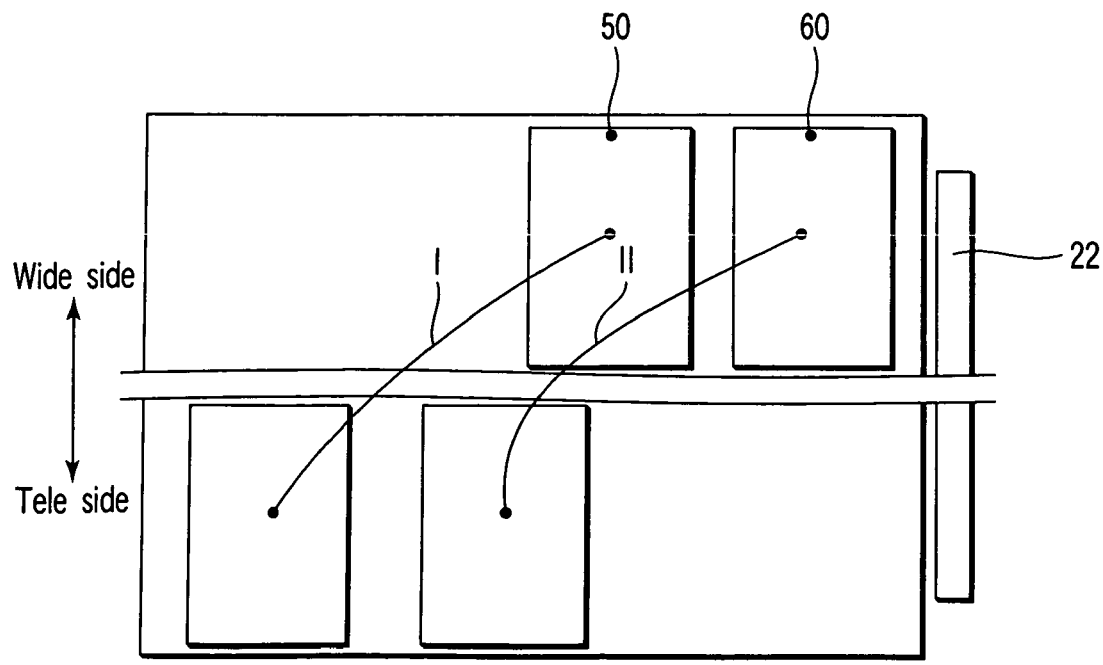
FIG. 5 is a diagram of zoom curves showing the relationship between the positions of the movable sections in association with movement and a zoom scale factor in the zoom lens unit shown in FIGS. 1 and 2.
Figure 6:
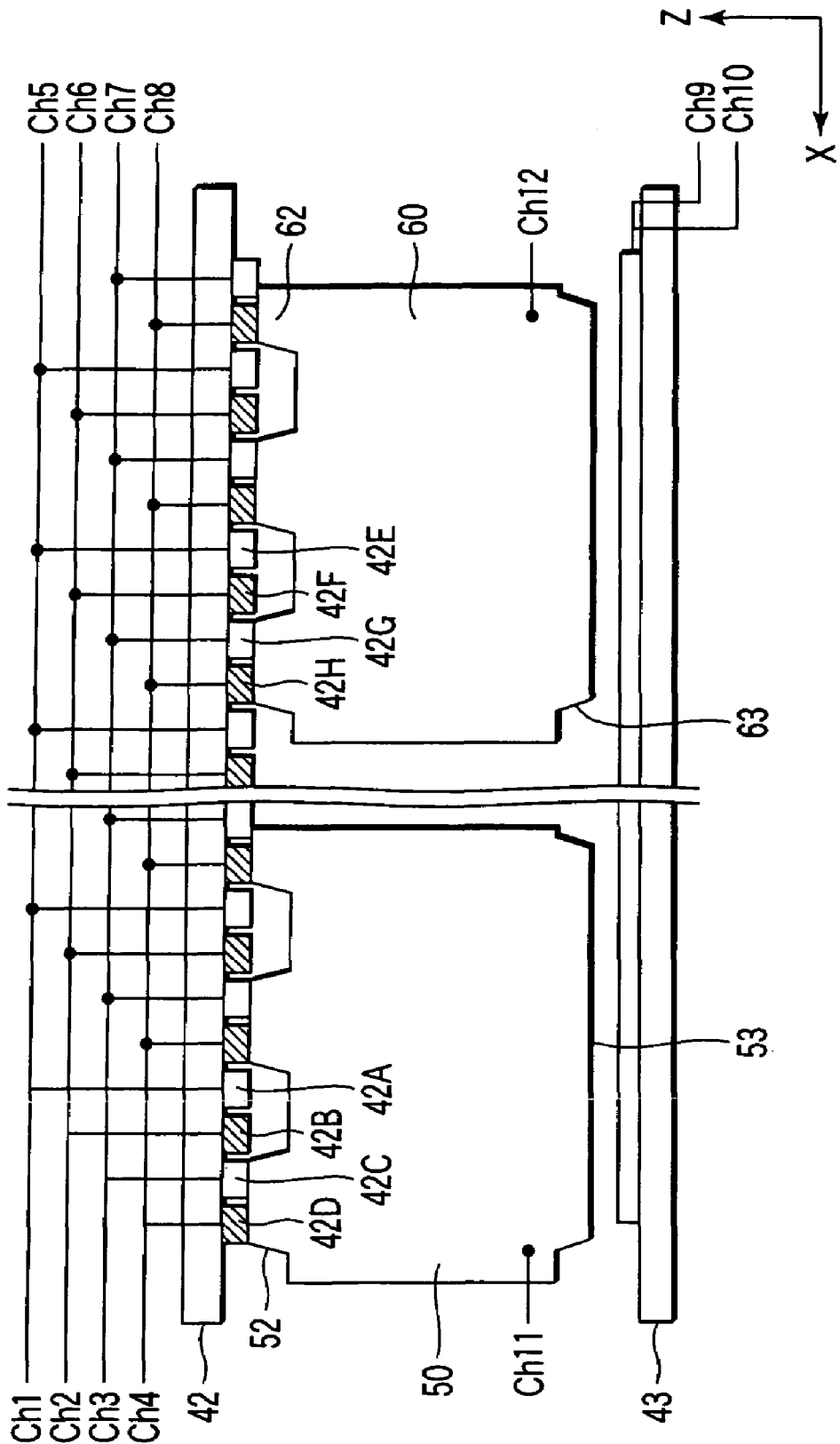
FIG. 6 is a sectional view schematically showing an arrangement of electrodes and connections among them in the zoom lens unit shown in FIGS. 1 and 2.

FIG. 1 is a partly cutaway perspective view showing an image pickup apparatus 10 into which a zoom lens unit according to a first embodiment of the present invention is incorporated. FIG. 2 is an exploded perspective view showing the image pickup apparatus shown in FIG. 2. FIGS. 3A to 3E are plan views schematically showing a first movable section 50, a driving electrode substrate 42, and a second movable section 60 shown in FIGS. 1 and 2. FIG. 4 is a plan view schematically showing a holding electrode substrate 43 shown in FIGS. 1 and 2. FIG. 5 is a diagram of zoom curves representing the relationship between the positions of the first and second movable sections in association with movement and a zoom scale factor in the zoom lens unit. FIG. 6 is a vertical sectional view schematically showing a zoom lens unit shown in FIG. 1. In FIGS. 1 to 6, arrows X, Y, and Z show directions orthogonal to one another. Arrow X corresponds to a direction (predetermined direction) in which a cavity portion is penetrated, that is, the direction in which the first and second movable sections 50 and 60 are moved. Arrow X also corresponds to the direction of an optical axis. Further, in the embodiments described below, arrow Z in FIG. 1 corresponds to an upward direction.

As shown in FIGS. 1 and 2, the image pickup device 10 comprises a zoom lens unit 30 that transmits an image of a subject using a zoom scale factor, and an image pickup element section 20 that photographs the transmitted subject image. The image pickup element section 20 comprises a substrate 21, and an optical sensor 22 such as a CCD and a controlling electronic part 23 arranged on the substrate 21. A driving control circuit 24 is incorporated into the electronic part 23 to drive the zoom lens unit 30, composed of an electrostatic actuator described below.

As shown in FIGS. 1 and 2, the zoom lens unit 30 comprises a cylindrical cover 31 internally having a cavity portion extending along the direction X, a stator 40 fixed in the cavity portion, and a first movable section 50 and a second movable section 60 independently driven inside the stator 40. The first and second movable sections 50 and 60 are inserted and arranged in a stator frame 41 so as to be movable along the optical axis, i.e., the direction X while being separated from each other.

The stator 40 comprises the stator frame 41 having a hollow parallelepiped frame having a cavity portion. The stator frame 41 has an upper inner surface 41A and a lower inner surface 41B which are opposite to each other. A driving electrode substrate 42 is mounted on the upper inner surface 41A to drive the first and second movable sections 50 and 60. Moreover, a holding electrode substrate 43 is mounted on the lower inner surface 41B to hold the movable positions 50 and 60 at particular positions.

Plural groups of electrodes 42A to 42D are formed in a central area of a surface of the driving electrode substrate 42, made of an insulating material as shown in FIG. 3C; the electrodes are patterned in a desired shape and drive the first movable section 50. The electrodes 42A to 42D extend in a direction Y orthogonal to the moving direction X and are arranged in parallel in the moving direction X. The driving electrodes 42A to 42D are arranged in the central area of the substrate surface in order to drive the first movable section 50. The insulating material substrate may be, for example, a glass plate, or an insulating substrate for a printed circuit board such as a silicon wafer, aramid, or glass epoxy which has a thermal oxide film formed on its surface. Each electrode has a width of several μm to several tens of μm. The spacing between the electrodes is several μm to several tens of μm. The electrodes 42A to 42D are arranged at a fixed pitch. The term "fixed pitch" as used in the specification includes a machining error that may occur during machining.

Plural groups of electrodes 42E to 42H are formed in areas on the opposite sides of the driving electrode substrate 42 to drive the second movable section 60. The electrodes 42E to 42H extend in the direction Y orthogonal to the moving direction X. The driving electrodes 42A to 42D are arranged in parallel in the areas on the opposite sides of the substrate surface. Each electrode has a width of several μm to several tens of μm. The spacing between the electrodes is several μm to several tens of μm. The electrodes are arranged at a fixed pitch.

A smaller electrode pitch improves the minimum movement resolution of the first and second movable sections 50 and 60. However, an excessively small pitch requires the first and second movable sections 50 and 60 and the driving electrodes 42A to 42H to be machined very precisely. This increases costs. For example, if the driving electrode substrate 42 is composed of a silicon wafer having a thermal oxide film on its surface, each of the driving electrodes 42A to 42D has a width of about 12 μm, a spacing of about 4 μm, and a pitch of about 16 μm.

The central area of the driving substrate 42 in which the driving electrodes 42A to 42D are arranged is specified to have a predetermined length corresponding to the moving range of the first movable section 50. The areas on the opposite sides of the driving substrate 42 in which the driving electrodes 42E to 42H are arranged is specified to have a predetermined length corresponding to the moving range of the second movable section 60. Further, the surfaces of the driving electrodes 42A to 42H are covered with an insulating film (not shown), which are smoothed.

Moreover, the driving electrodes 42A to 42H are connected to the driving control circuit 24 of the electronic part 23. The driving control circuit 24 inputs a control voltage signal to the driving electrodes 42A to 42H for driving. That is, the voltage signal is applied independently to the driving electrodes 42A to 42H in each group. For example, if a voltage is applied to the driving electrodes 42A, the voltage signal is applied to convex portions corresponding to the driving electrodes 42A in all the groups on the driving electrode substrate 42. In this case, the driving electrodes 42A correspond to a channel 1 (ch1), the driving electrodes 42B correspond to a channel 2 (ch2), the driving electrodes 42C correspond to a channel 3 (ch3), and the driving electrodes 42D correspond to a channel 4 (ch4). The driving electrodes 42E correspond to a channel 5 (ch5), the driving electrodes 42F correspond to a channel 6 (ch6), the driving electrodes 42G correspond to a channel 7 (ch7), and the driving electrodes 42H correspond to a channel 8 (ch8). The driving electrodes 42A to 42D belong to the group of first driving electrodes used to drive the first movable section 50. The driving electrodes 42E to 42H belong to the second driving electrodes used to drive the second movable section 60.

The holding electrode substrate 43 is formed by patterning a desired shape on a surface of an insulating material substrate as shown in FIG. 4. A stripe electrode 43A (first holding electrode) and a stripe electrode 43B (second holding electrode) are formed in parallel over the moving ranges of the first and second movable sections 50 and 60; the stripe electrode 43A corresponds to first movable section electrodes 53 of the first movable section 50 and the stripe electrode 43B corresponds to second movable section electrodes 63 (described below) of the second movable section 60. The insulating material substrate may be, for example, a glass plate, or an insulating substrate for a printed circuit board such as a silicon wafer, aramid, or glass epoxy which has a thermal oxide film formed on its surface. In this case, the stripe electrode 43B for the second movable section corresponds to a channel 9 (ch9). The stripe electrode 43A for the first movable section corresponds to a channel 10 (ch10). The stripe electrodes 43A and 43B are electrically independently arranged so as to independently control the first and second movable sections 50 and 60.

The first movable section 50 comprises a substantially parallelepiped support 51 formed of a conductive material and having a hollow portion opened so as to extend in the direction X as shown in FIGS. 1 and 2. The support 51 can be formed by, for example, physically grinding or chemically etching a conductive material. Alternatively, the support 51 can be formed by injecting a conductive material. Movable section driving electrodes 52 are formed on the top surface of the support 51 in association with the electrodes 42A to 42D as shown in FIG. 3A. The first movable section electrodes 53 are formed on the bottom surface of the support 51 in association with the stripe electrode 43A. Moreover, a lens 54 is fixed to the hollow portion.

In the movable section driving electrodes 52, a plurality of projection-like stripes are extended orthogonally to the moving direction X of the first movable section 50 as shown in FIG. 3A. The stripes are arranged in parallel in the moving direction X. The stripes correspond to concave and convex portions formed on the surfaces of the electrodes 52. The spacing between the stripes is set at, for example, about 32 μm. The height of the convex portion is set at about 10 μm from the surface in the recessed portion. This height may be at least 10 μm and may thus be larger than 10 μm. The width of convex of the movable section driving electrode 52 is double the pitch of the driving electrodes 42A to 42H. The bottom surface of concave of the movable section driving electrode 52 is specified to have a width equal to double the pitch of the driving electrodes 42A to 42H. If the driving electrode substrate 42 is composed of a silicon wafer having a thermal oxide film formed on its surface, the concaves or convexes of the movable section driving electrodes 52 are arranged at a pitch of about 64 μm.

Steps 55 are provided on the opposite sides of the area in which the movable section driving electrodes 52 are formed on the support 51, constituting the first movable section 50. The steps 55 are provided opposite the driving electrodes 42E to 42H to create a sufficient gap between the electrodes 52 and the electrodes 42E to 42H. The depth of the steps 55 which provides this gap is about 10 μm from the convex portions of the movable section driving electrodes 52. This depth may be at least 10 μm and may thus be larger than 10 μm.

The first movable section electrodes 53 is extended in the moving direction of the first movable section 50 and opposite the electrode 43A, shown in FIG. 4. In the first movable section electrodes 53, a plurality of projection-like stripes are formed in parallel in the direction Y. In this case, the first movable section electrodes 53 correspond to a channel 11 (ch11).

The second movable section 60 comprises a substantially parallelepiped support 61 formed of a conductive material and having a hollow portion as shown in FIGS. 1 and 2. The support 61 can be formed by, for example, physically grinding or chemically etching a conductive material. Alternatively, the support 61 can be formed by injecting a conductive material. Movable section driving electrodes 62 are formed on the top surface of the support 61. The second movable section electrodes 63 are formed on the bottom surface of the support 61. Moreover, a lens 64 is fixed to the hollow portion.

Movable section driving electrodes 62 are formed on the top surface of the second movable section 60 as shown in FIG. 3E. The movable section driving electrodes 62 are formed as a plurality of stripes composed of concaves and convexes arranged in the moving direction X. The stripes formed like projections by etching so as to extend orthogonally to the moving direction X of the second movable section 60 as shown in FIG. 3A. The spacing between the stripes is, for example, about 32 μm. The height of the convex portion is about 10 μm from the surface in the recessed portion. This height may be at least 10 μm and may thus be larger than 10 μm. That is, the width of convex of the movable section driving electrode 62 is double the pitch of the driving electrodes 42A to 42H. Further, the bottom surface of concave of the movable section driving electrode 62 has a width equal to double the pitch of the driving electrodes 42A to 42H. If, for example, the driving electrode substrate 42 is composed of a silicon wafer having a thermal oxide film formed on its surface, the concaves or convexes of the movable section driving electrodes 62 are arranged at a pitch of about 64 μm.

A recessed portion 65 is formed between areas on the support 61 in which the movable section driving electrodes 62 are provided, as shown in FIG. 3D. The recessed portion 65 is provided opposite the driving electrodes 42A to 42D to create a sufficient gap between the recessed portion 65 and the electrodes 42A to 42D. The depth of the recessed portion 65 is about 10 μm from the convex portions of the movable section driving electrodes 62. This depth may be at least 10 μm and may thus be larger than 10 μm.

In the second movable section electrodes 63, a plurality of projection-like stripes are formed by etching so as to extend in the moving direction of the first movable section 50 and opposite the electrode 43B and to lie in parallel along the direction Y. In this case, the second movable section electrodes 63 correspond to a channel 12 (ch12).

The electrodes are driven as shown in FIG. 6 to change the above arrangement of the lens 54 in the first movable section 50 and the lens 64 in the second movable section 60 as shown by zoom curves I and II in FIG. 5. A lens system composed by both lenses is zoomed between a Wide side and a Tele side. The subjected is then focused on in accordance with the zoomed focal distance. FIG. 5 shows the relationship between zoom ratio and the positions of centers of the first and second movable sections 50 and 60 in the direction X.

Specifically, the zoom ratio of the first movable section 50 is determined by the moving distance of the first movable section 50 and the number of steps corresponding to the moving distance as shown in Table 1.

TABLE 1

(First movable section 50)

| Zoom ratio (X axis) | Moving Distance | Number of steps (Y axis) |
|---|---|---|
| 1.00 | 0.000 | 0 |
| 1.19 | 0.675 | 42 |
| 1.38 | 1.282 | 80 |
| 1.57 | 1.813 | 113 |
| 1.76 | 2.278 | 142 |
| 1.95 | 2.688 | 168 |
| 2.14 | 3.053 | 191 |
| 2.24 | 3.222 | 201 |
| 2.43 | 3.539 | 221 |

Figure 7:
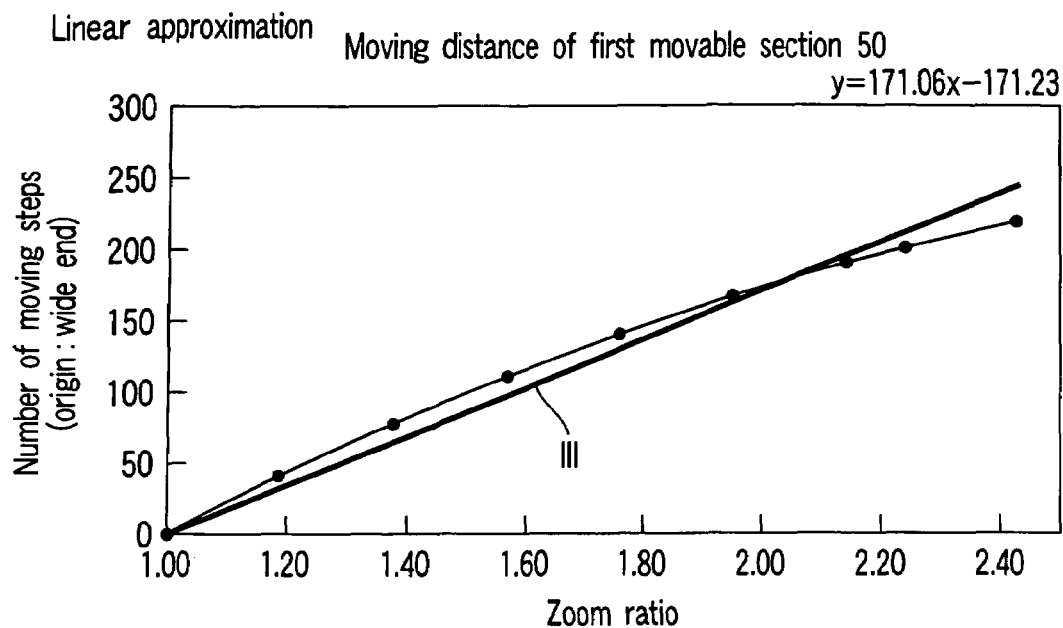
FIG. 7 is a diagram of zoom curves linearly approximately showing the relationship between a zoom ratio and the number of movement steps corresponding to the amount of movement of the first movable section in the zoom lens unit shown in FIGS. 1 and 2.
Figure 8:
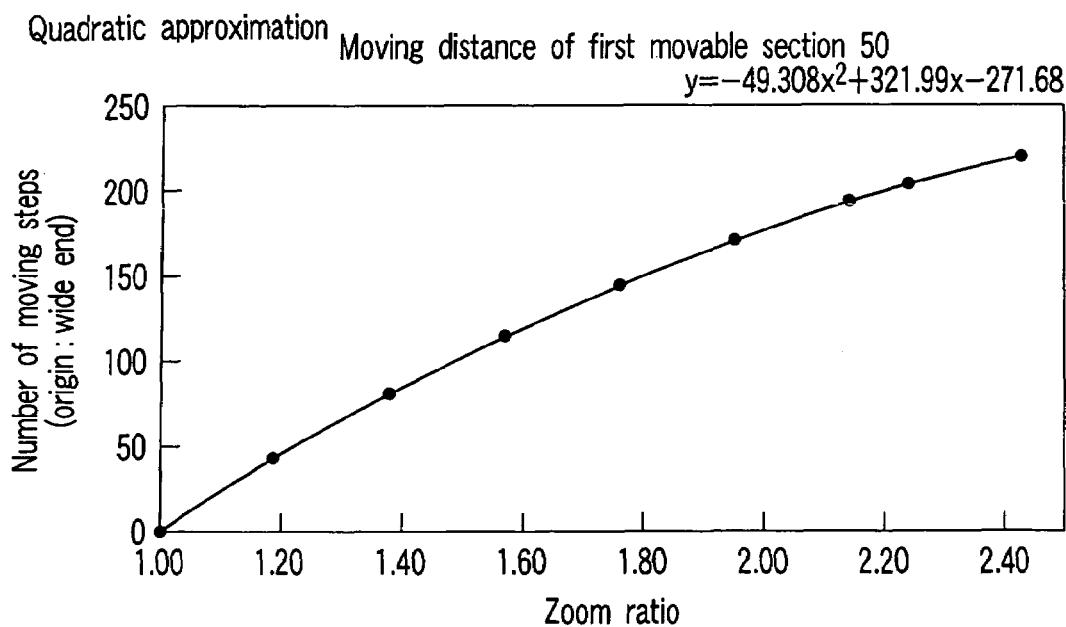
FIG. 8 is a diagram of zoom curves showing quadratically approximately showing the relationship between a zoom ratio and the number of movement steps corresponding to the amount of movement of the first movable section in the zoom lens unit shown in FIGS. 1 and 2.

Graph III shown in FIG. 7 is obtained by plotting the zoom ratio from Table 1 on the X axis and the number of steps from Table 1 on the Y axis. Table 2 is obtained by linearly and quadratically approximating the number of steps from Table 1. Graph IV shown in FIG. 7 and graph V shown in FIG. 8 are obtained by plotting Table 2.

TABLE 2

| Linear approximation | Quadratic approximation |
|---|---|
| 0 | 0 |
| 32 | 41 |
| 65 | 78 |
| 97 | 112 |
| 130 | 142 |
| 162 | 168 |
| 195 | 191 |
| 212 | 202 |
| 244 | 219 |

Specifically, the zoom ratio of the second movable section 60 is determined by the moving distance of the second movable section 60 and the number of steps corresponding to the moving distance as shown in Table 3.

TABLE 3

(Second movable section 60)

| Zoom ratio (X axis) | Moving Distance | Number of steps (Y axis) |
|---|---|---|
| 1.00 | 0.000 | 0 |
| 1.19 | 1.000 | 63 |
| 1.38 | 1.670 | 104 |
| 1.57 | 2.110 | 132 |
| 1.76 | 2.374 | 148 |
| 1.95 | 2.494 | 156 |
| 2.14 | 2.486 | 155 |
| 2.24 | 2.436 | 152 |
| 2.43 | 2.240 | 140 |

Figure 9:
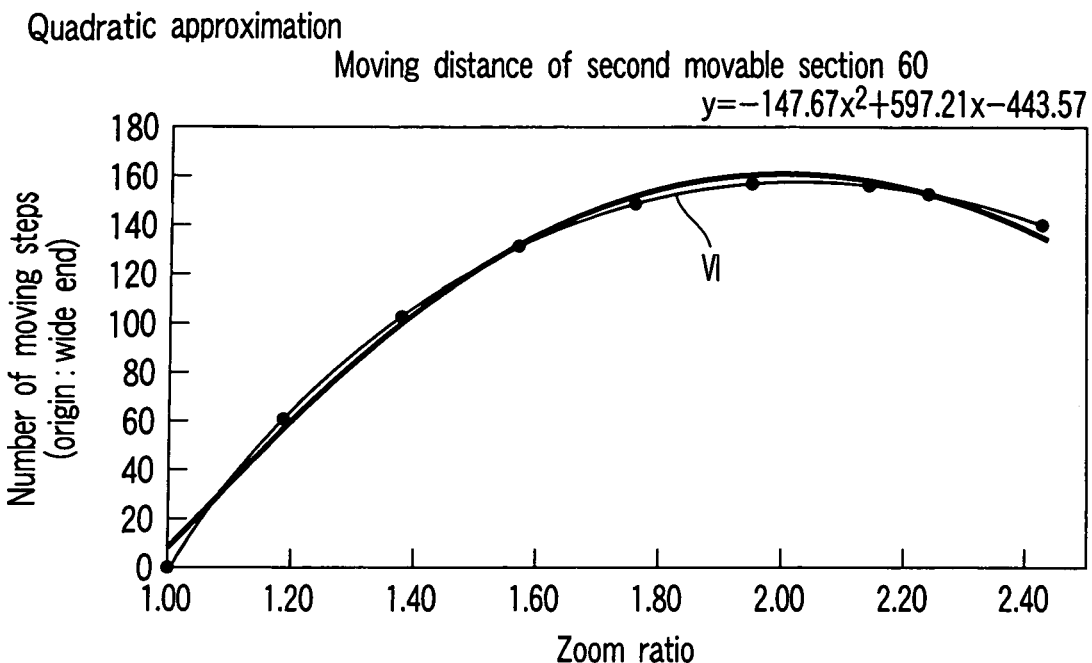
FIG. 9 is a diagram of zoom curves linearly approximately showing the relationship between a zoom ratio and the number of movement steps corresponding to the amount of movement of the second movable section in the zoom lens unit shown in FIGS. 1 and 2.

Graph VI shown in FIG. 9 is obtained by plotting the zoom ratio from Table 3 on the X axis and the number of steps from Table 3 on the Y axis. Table 4 is obtained by linearly and quadratically approximating the number of steps from Table 2. Graph VIII shown in FIG. 9 and graph VIII shown in FIG. 10 are obtained by plotting Table 4.

TABLE 4

| Linear approximation | Quadratic approximation |
|---|---|
| 0 | 0 |
| 52 | 60 |
| 93 | 103 |
| 124 | 132 |
| 144 | 148 |
| 153 | 155 |
| 152 | 153 |
| 147 | 150 |
| 130 | 140 |

Figure 10:
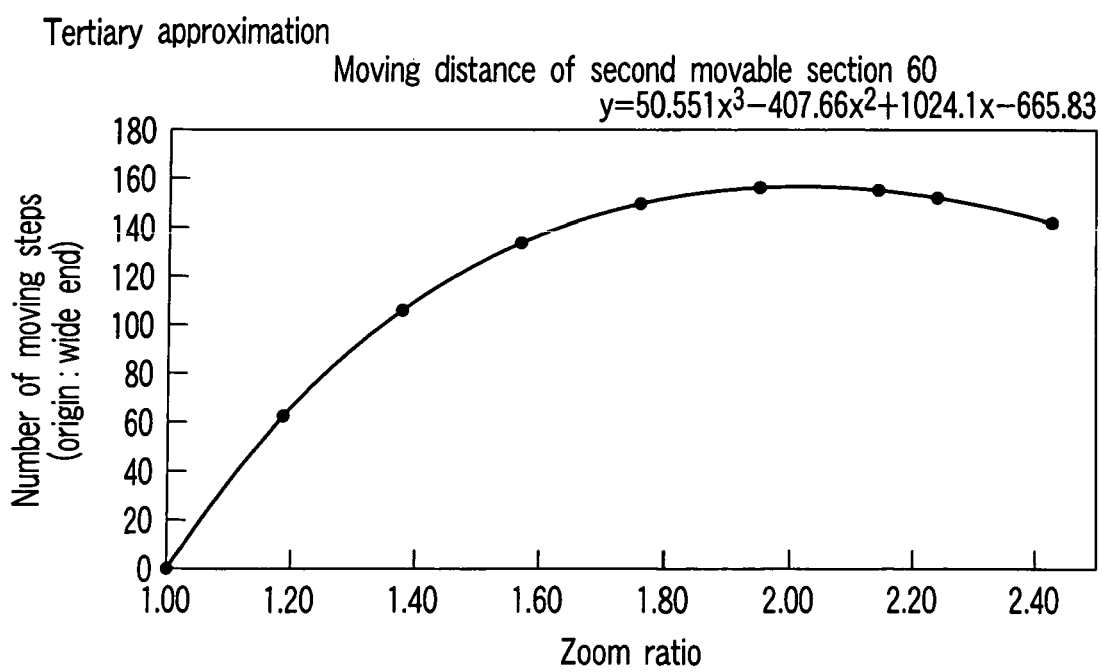
FIG. 10 is a diagram of zoom curves showing quadratically approximately showing the relationship between a zoom ratio and the number of movement steps corresponding to the amount of movement of the second movable section in the zoom lens unit shown in FIGS. 1 and 2.

As shown in FIGS. 7 to 10, during zooming between the Wide side and the Tele side, the zoom ratio is varied as shown in FIGS. 7 to 10 by moving the centers of the first and second movable sections 50 and 60 along the direction X. Although the first and second movable sections 50 and 60 are ideally moved as shown in FIGS. 7 to 10, approximate equations may be used to simply calculate the moving distances. FIGS. 7 and 8 show two examples of approximate equations used to calculate the moving distance of the first movable section 50. FIGS. 9 and 10 show two examples of approximate equations used to calculate the moving distance of the second movable section 60. Tables 2 and 4 show the numbers of moving steps calculated using the approximate equations.

In the image pickup apparatus 10 configured as described above, the first and second movable sections 50 and 60 are driven as described below.

For the first movable section 50, a potential difference is applied to between the driving electrodes 42A to 42D and the movable section electrode 52. A potential difference is also applied to between the stripe electrode 43A and the first movable section electrodes 53. Then, an electrostatic force is generated between the driving electrodes 42A to 42D and the movable section electrode 53 and between the stripe electrode 43A and the first movable section electrodes 53; a force is exerted in the direction in which the electrodes are attracted to each other. As disclosed in, for example, Jpn. Pat. Appln. KOKAI Publication No. 2004-126009 and the corresponding U.S. patent application Ser. No. 10/672,409, filed Sep. 29, 2003, Koga et al, the position of the first movable section 50 can be moved by switching the driving electrodes 42A to 42D and stripe voltage 43A, which provide potential differences. U.S. patent application Ser. No. 10/672,409 is incorporated into the specification and its description is omitted.

For the second movable section 60, a potential difference is applied to between the driving electrodes 42E to 42H and the movable section electrode 62. A potential difference is also applied to between the stripe electrode 43B and the second movable section electrodes 63. Then, an electrostatic force is generated between the driving electrodes 42E to 42H and the movable section electrode 62 and between the stripe electrode 43B and the second movable section electrodes 63; a force is exerted in the direction in which the electrodes are attracted to each other. As in the case of the first movable section 50, the position of the second movable section 60 can be moved by switching the driving electrodes 42E to 42H and stripe voltage 43B, which provide potential differences, as disclosed in Jpn. Pat. Appln. KOKAI Publication No. 2004-126009.

Further, to hold the first movable section 50, a potential difference is applied to between the stripe electrode 43A and the first movable section electrode 53. Then, an electrostatic force is generated between the stripe electrode 43A and the first movable section electrode 53; a force is exerted in the direction in which the electrodes are attracted to each other. To hold the second movable section 60, a potential difference is applied to between the stripe electrode 43B and the second movable section electrode 63.

The image pickup apparatus 10 and zoom lens unit 30 configured as described above have the steps 55. Accordingly, there is a long distance between the driving electrodes 42E to 42H and both the movable section electrode 52 and support 51. Consequently, the attracting force exerted between the driving electrodes 42E to 42H and both movable section electrode 52 and support 51 is much weaker than that exerted between the movable section electrodes 52 and the driving electrodes 42A to 42D. The attracting force exerted between the driving electrodes 42E to 42H and both movable section electrode 52 and support 51 is much weaker than that exerted between the stripe electrode 43A and the first movable section electrode 53. Therefore, movement and holding of the first movable section 50 are not hindered by the attracting force exerted between the driving electrodes 42E to 42H and both movable section electrode 52 and support 51.

Furthermore, the presence of the recessed portion 65 results in a long distance between the driving electrodes 42E to 42H and both movable section electrode 62 and support 61. Thus, the attracting force exerted between the driving electrodes 42A to 42D and both movable section electrode 62 and support 61 is much weaker than that exerted between the movable section electrodes 62 and the driving electrodes 42E to 42H. The attracting force exerted between the driving electrodes 42A to 42D and both movable section electrode 62 and support 61 is much weaker than that exerted between the stripe electrode 43B and the second movable section electrode 63. Therefore, movement and holding of the first movable section 50 are not hindered by the attracting force exerted between the driving electrodes 42A to 42D and both movable section electrode 62 and support 61.

That is, the first and second movable sections 50 and 60 can be independently controlled. The term "independent control" as used in the specification refers to the ability to move the first and second movable sections 50 and 60 in different directions or at different speeds, to vary the speeds of the first and second movable sections 50 and 60 at different accelerations, or to move only one of the first and second movable sections 50 and 60. The first and second movable sections 50 and 60 can be moved in accordance with the zoom curves shown in FIGS. 5 and 6 or approximate equations approximating the zoom curves. This makes it possible to reduce the degree at which the subject gets out of focus during a zoom operation.

(Second Embodiment)

FIGS. 11A to 11D schematically show the internal top surface structures of an electrode substrate 143 and the first and second movable sections 50 and 60 in the image pickup apparatus 10 into which a zoom lens unit according to the second embodiment of the present invention is incorporated. FIGS. 12A to 12C schematically show the internal bottom surface structures of an electrode substrate 142 and the first and second movable sections 50 and 60 in the image pickup apparatus 10 into which the zoom lens unit according to the second embodiment of the present invention is incorporated.

Plural groups of driving electrodes 42A to 42D are formed on a surface of the driving electrode substrate 42, made of an insulating material as shown in FIG. 12B; the electrodes are patterned in a desired shape. To drive the first movable section 50, the driving electrodes 42A to 42D extend in the direction Y orthogonal to the moving direction X and are arranged in parallel in the moving direction X. Like the driving electrode substrate 42, shown in FIG. 1, the insulating material substrate may be, for example, a glass plate, or an insulating substrate for a printed circuit board such as a silicon wafer, aramid, or glass epoxy which has a thermal oxide film formed on its surface. Each electrode has a width of several µm to several tens of µm. The spacing between the electrodes is several µm to several tens of µm. The electrodes are arranged at a fixed pitch.

In addition to the driving electrodes 42A to 42D, the stripe electrodes 43B are arranged in parallel on the electrode substrate 142 and opposite the second movable section electrodes 63 of the second movable section 60 in order to hold the second movable section electrodes 63.

Figure 11E:
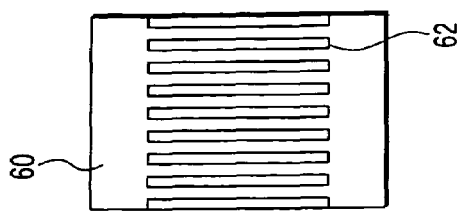
FIGS. 11D and 11E are plan views schematically showing a front surface and a top surface, respectively, of a second movable section of the zoom lens unit according to the second embodiment of the present invention.
Figure 11D:
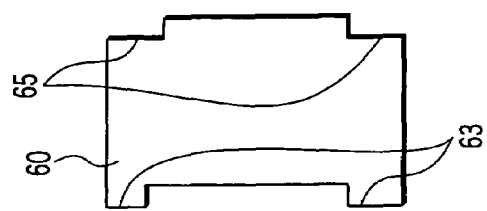
Figure 11C:
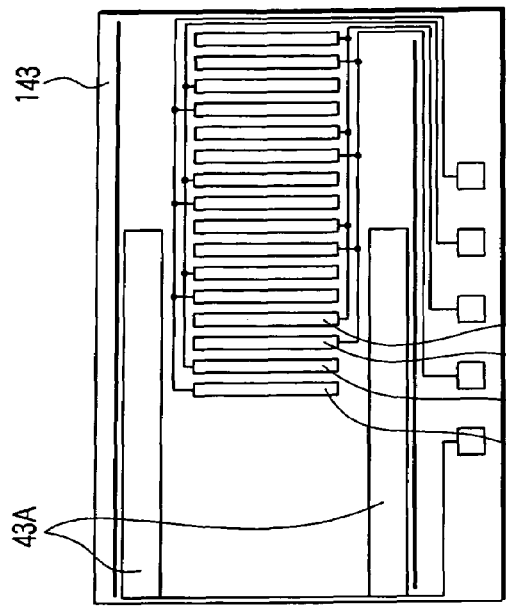
FIG. 11C is a plan view schematically showing an arrangement of electrodes on an inner top surface of a stator in the zoom lens unit according to the second embodiment of the present invention.
Figure 11B:
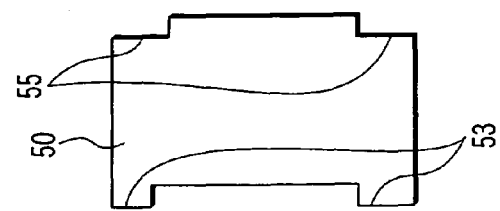
FIGS. 11A and 11B are plan views schematically showing a top surface and a front surface of a first movable section in a zoom lens unit according to a second embodiment of the present invention.
Figure 11A:
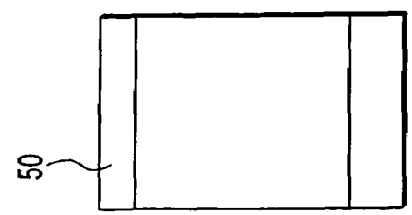
Figure 12C:
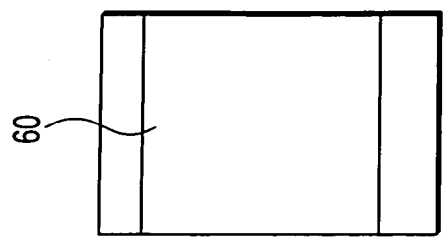
FIG. 12C is a plan view schematically showing a top surface of a second movable section shown in FIGS. 11D and 11E.
Figure 12B:
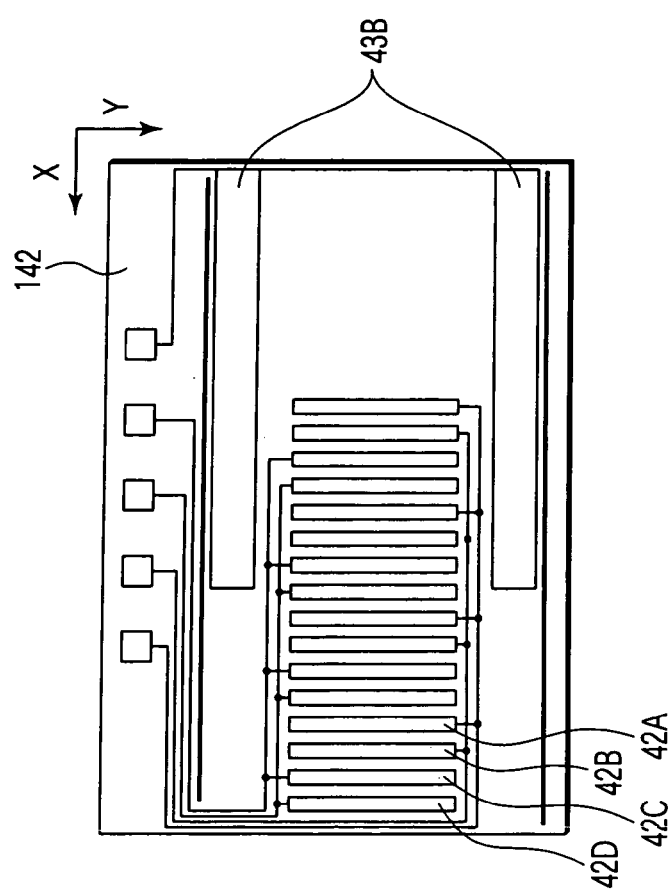
FIG. 12B is a plan view schematically showing an arrangement of electrodes on an inner top surface of a stator shown in FIG. 1.
Figure 12A:
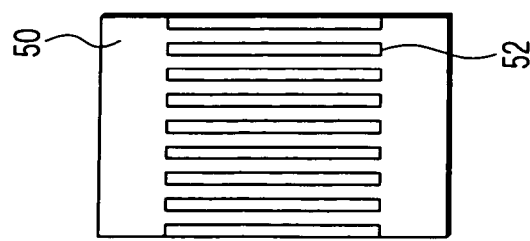
FIG. 12A is a plan view schematically showing a top surface of a first movable section shown in FIGS. 11A and 11B.

Plural groups of driving electrodes 42E to 42H are formed on a surface of the driving electrode substrate 143, made of an insulating material, as shown in FIG. 11C; the electrodes are patterned in a desired shape. To drive the first movable section 50, the driving electrodes 42E to 42H extend in the direction Y orthogonal to the moving direction X and are arranged in parallel. Like the driving electrode substrate 42, shown in FIG. 1, the insulating material substrate may be, for example, a glass plate, or an insulating substrate for a printed circuit board such as a silicon wafer, aramid, or glass epoxy which has a thermal oxide film formed on its surface. Each electrode has a width of several µm to several tens of µm. The spacing between the electrodes is several µm to several tens of µm. The electrodes are arranged at a fixed pitch.

In addition to the driving electrodes 42E to 42H, the stripe electrodes 43A corresponding to the first movable section electrodes 53 of the first movable section 50 are arranged in parallel on the electrode substrate 143 in order to hold the second movable section 60. The driving electrodes 42A to 42H and the stripe electrodes 43A and 43B are the same as those described in the first embodiment, shown in FIG. 1, in terms of structure, method used, and operation and differ from them only in installation position and size.

The image pickup apparatus 10 and zoom lens unit 30 configured as described above have the steps 55. Accordingly, the movable section electrode 52 does not lie opposite the driving electrodes 42E to 42H. There is a gap; that is, a sufficient distance, between the support 51 and the driving electrodes 42E to 42H. Consequently, the attracting force exerted between the movable section electrodes 52 and the driving electrodes 42E to 42H and between the support 51 and the driving electrodes 42E to 42H is much weaker than that exerted between the movable section electrodes 52 and the driving electrodes 42A to 42D. The attracting force exerted between the movable section electrodes 52 and the driving electrodes 42E to 42H and between the support 51 and the driving electrodes 42E to 42H is much weaker than that exerted between the stripe electrode 43A and the first movable section electrode 53. Therefore, movement and holding of the first movable section 50 are not hindered by the attracting force exerted between the movable section electrodes 52 and the driving electrodes 42E to 42H and between the support 51 and driving electrodes 42E to 42H.

Furthermore, the movable section 60 has the recessed portion 65. Accordingly, the movable section electrode 62 does not lie opposite the driving electrodes 42A to 42D. There is a gap, that is, a sufficient distance, between the support 61 and the driving electrodes 42A to 42D. Consequently, the attracting force exerted between the movable section electrodes 62 and the driving electrodes 42A to 42D and between the support 61 and the driving electrodes 42A to 42D is much weaker than that exerted between the movable section electrodes 62 and the driving electrodes 42E to 42H. The attracting force exerted between the movable section electrodes 62 and the driving electrodes 42A to 42D and between the support 61 and the driving electrodes 42A to 42D is much weaker than that exerted between the stripe electrode 43B and the second movable section electrode 63. Therefore, movement and holding of the first movable section 50 are not hindered by the attracting force exerted between the driving electrodes 42A to 42D and both the movable section electrodes 62 and support 61.

The above structure enables the first and second movable sections 50 and 60 to be independently controlled. The term "independent control" as used in the specification refers to the ability to move the first and second movable sections 50 and 60 in different directions or at different speeds, to vary the speeds of the first and second movable sections 50 and 60 at different accelerations, or to move only one of the first and second movable sections 50 and 60. The first and second movable sections 50 and 60 can be moved in accordance with the zoom curves shown in FIGS. 7 to 10 or approximate equations approximating the zoom curves. This makes it possible to reduce the degree at which the subject gets out of focus during a zoom operation.

Further, compared to the first embodiment, the present embodiment can lay out the driving electrodes 42A to 42H so that the electrodes occupy a larger area. This is because the area on the electrode substrates 142 and 143 in which the driving electrodes 42E to 42H can be arranged is larger when the driving electrodes 42A to 42D and stripe electrodes 43B are provided on one of the substrates, while the driving electrodes 42E to 42H and stripe electrodes 43A are provided on the other substrate than when all the driving electrodes 42A to 42H, having less dense conductive portions than the stripe electrodes 43A and 43B. The reason is as described below. Ideally, the ratio of the area of the driving electrodes 42A to 42H for each channel to the area of the stripe electrodes 43A and 43B for each channel is 1:1. Each of the driving electrodes 42A to 42H is composed of an electrode portion and a spacing portion. If line and space (the ratio of the electrode portion to the spacing portion) is 3:1, then in order to provide the driving electrodes 42A to 42H having the same area as that of the stripe electrodes 43A and 43B, about 1.3 times as large a dedicated area must be provided for the driving electrodes 42A to 42H. This increases the area in which the driving electrodes 42E to 42H can be arranged.

If the driving electrodes 42A to 42H are laid out so as to have a larger area, a smaller potential difference can be used to exert an attracting force between the driving electrodes 42A to 42D and the movable section electrodes 52 and between the driving electrodes 42E to 42H and the movable section electrodes 62. This makes it possible to reduce the power consumption of the image pickup apparatus 10 and zoom lens unit 30.

(Third Embodiment)

Figure 14:
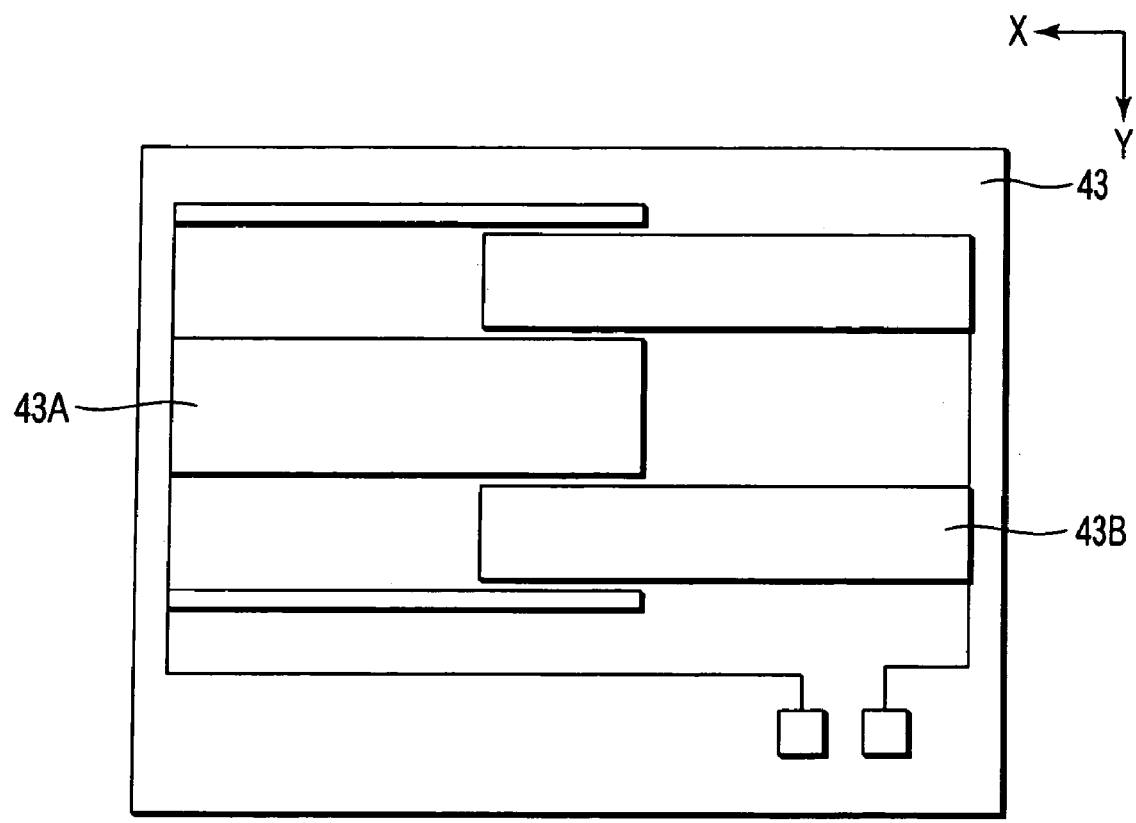
FIG. 14 is a plan view schematically showing an arrangement of electrodes on an inner bottom surface of the stator shown in FIG. 13C.
Figures 15A, 15B:
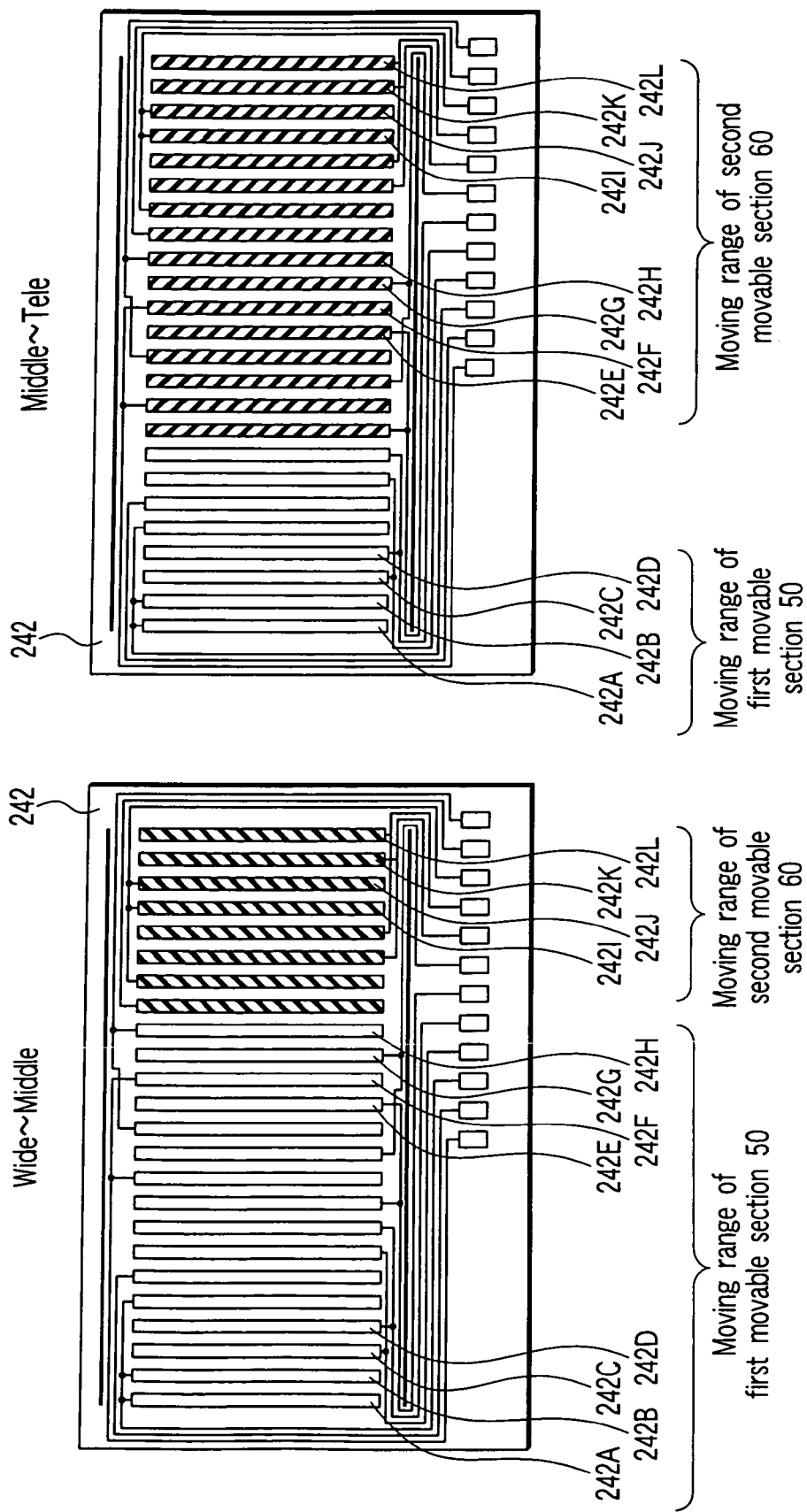
FIGS. 15A and 15B are plan views showing the relationship between the zoom ration of the zoom lens unit shown in FIGS. 13A to 14 and the moving ranges of the first and second movable sections in the arrangement of electrodes on the inner bottom surface of the stator.

FIGS. 13A to 13E schematically show the internal top surface structures of a driving electrode substrate 242 and the first and second movable sections 50 and 60 in the image pickup apparatus 10 that uses a zoom lens unit according to the third embodiment of the present invention. FIG. 14 schematically shows the internal bottom surface structures of the holding electrode substrate 43 in the image pickup apparatus 10 that uses the zoom lens unit according to the third embodiment of the present invention. FIGS. 15A and 15B schematically show the operational range of the driving electrode substrate 242 in the image pickup apparatus 10 that uses the zoom lens unit according to the third embodiment of the present invention. In the figures, arrows X, Y, and Z show directions orthogonal to one another. Arrow X corresponds to the direction (predetermined direction) in which the cavity portion is penetrated, that is, the direction in which the first and second movable sections 50 and 60 are moved. In FIGS. 13A to 15B, the same components as those shown in FIGS. 1 to 6 have the same reference numerals, and their description is omitted.

Plural groups of driving electrodes 242A to 242L are formed on a surface of the driving electrode substrate 242, made of a glass plate, as shown in FIG. 13C; the electrodes are patterned in a desired shape. To drive the first and second movable sections 50 and 60, the driving electrodes 242A to 242L extend in the direction Y orthogonal to the moving direction X and are arranged in parallel. Each electrode has a width of several μm to several tens of μm. The spacing between the electrodes is several μm to several tens of μm. The electrodes are arranged at a fixed pitch.

Now, description will be given of the parallel pattern of the driving electrodes 242A to 242L. For the driving electrodes 242A to 242L, the driving electrodes 242A to 242D are sequentially arranged in an area far from the sensor 22 (242A, 242B, 242C, 242D, 242A, 242B, . . . ). Then, the driving electrodes 242E to 242H are sequentially arranged in an area close to the sensor 22 (242E, 242F, 242G, 242H, 242E, 242F, . . . ). Finally, the driving electrodes 242I to 242L are sequentially arranged (242I, 242J, 242K, 242L, 242I, 242J, . . . ).

The driving electrodes 242A to 242D correspond to the first driving electrodes used to drive the first movable section 50. The driving electrodes 242I to 242L correspond to the second driving electrodes used to drive the second movable section 60. The driving electrodes 242E to 242H also correspond to the third driving electrodes used to drive the first movable section 50 or the second movable section 60.

The first movable section 50 can be moved in accordance with the zoom curve shown in FIG. 7 or 8, using the driving electrodes 242A to 242H. The second movable section 60 can be moved in accordance with the zoom curve shown in FIG. 9 or 10, using the driving electrodes 242E to 242L.

The driving electrodes 242E to 242H are arranged so as to prevent the first and second movable sections 50 and 60 from being simultaneously located at the position corresponding to the driving electrodes 242E to 242H when the first and second movable sections 50 and 60 are moved in accordance with the zoom curves shown in FIGS. 7 to 10. Here, the prevention of simultaneous location means that at least part of only one of the first and second movable sections 50 and 60 is located at the position corresponding to the driving electrodes 242E to 242H or that the area of the surface on which the movable section electrodes 52 or 62 are provided is less than 30%, whereas the area of the surface on which the other movable section electrodes 62 or 52 are provided is at least 30%, the movable section electrodes 52 or 62 are provided on the first or second movable sections 50 or 60, respectively, located at the position corresponding to the driving electrodes 242E to 242H.

During zooming between the Wide side and the Tele side, the first and second moving sections 50 and 60 are moved in accordance with the zoom curves shown in FIGS. 7 to 10. During zooming between the Wide area and an intermediate area (middle), the first movable section 50 is moved using the driving electrodes 242A to 242H. The second movable electrodes are moved using the driving electrodes 242I to 242L.

During zooming between the intermediate area (middle) and the Tele side, the first movable section 50 is moved using the driving electrodes 242A to 242D. The second movable electrodes are moved using the driving electrodes 242E to 242L.

The driving electrodes 242A to 242L are the same as those described in the first embodiment, shown in FIG. 1, in terms of structure, method used, and operation and differ from them only in installation position and size.

The driving electrodes 242E to 242H are arranged so as to prevent the first and second movable sections 50 and 60 from being simultaneously located at the position corresponding to the driving electrodes 242E to 242H when the first and second movable sections 50 and 60 are moved in accordance with the zoom curves shown in FIGS. 7 to 10. Accordingly, there is a long distance between the driving electrodes (242E to 242L or 242I to 242L) driving the second movable section 60 and both the movable section electrode 52 and support 51. Consequently, the attracting force exerted between the driving electrodes driving the second movable section 60 and both the movable section electrode 52 and support 51 is much weaker than that exerted between the movable section electrodes 52 and the driving electrodes (242A to 242D or 242A to 242H) driving the first movable section 50.

Further, the attracting force exerted between the driving electrodes driving the second movable section 60 and both the movable section electrode 52 and support 51 is much weaker than that exerted between the stripe electrode 43A and the first movable section electrode 53. Therefore, movement and holding of the first movable section 50 are not hindered by the attracting force exerted between the driving electrodes driving the second movable section 60 and both the movable section electrode 52 and support 51.

Furthermore, The driving electrodes 242E to 242H are arranged so as to prevent the first and second movable sections 50 and 60 from being simultaneously located at the position corresponding to the driving electrodes 242E to 242H when the first and second movable sections 50 and 60 are moved in accordance with the zoom curves shown in FIGS. 5 and 6. Accordingly, there is a long distance between the driving electrodes (242A to 242H or 242A to 242D) driving the first movable section 50 and both the movable section electrode 62 and support 61. Consequently, the attracting force exerted between the driving electrodes driving the first movable section 50 and both the movable section electrode 62 and support 61 is much weaker than that exerted between the movable section electrodes 62 and the driving electrodes (242E to 242L or 242I to 242L) driving the second movable section 60.

Further, the attracting force exerted between the driving electrodes driving the first movable section 50 and both the movable section electrode 62 and support 61 is much weaker than that exerted between the stripe electrode 43B and the second movable section electrode 63. Therefore, movement and holding of the first movable section 50 are not hindered by the attracting force exerted between the driving electrodes driving the first movable section 50 and both the movable section electrode 62 and support 61.

That is, the first and second movable sections 50 and 60 can be independently controlled. The term "independent control" refers to the ability to move the first and second movable sections 50 and 60 in different directions or at different speeds, to vary the speeds of the first and second movable sections 50 and 60 at different accelerations, or to move only one of the first and second movable sections 50 and 60. The first and second movable sections 50 and 60 can be moved in accordance with the zoom curves shown in FIGS. 7 to 10 or approximate equations approximating the zoom curves. This makes it possible to reduce the degree at which the subject gets out of focus during a zoom operation.

Further, compared to the second embodiment, the present embodiment can lay out the driving electrodes 242A to 242L so that the electrodes occupy a larger area. This is because the driving electrodes 242A to 242L, having less dense conductive portions than the stripe electrodes 43A and 43B, need not be arranged in the direction Y orthogonal to the stripe electrodes 43A and 43B or the moving direction A.

If the driving electrodes 242A to 242L are laid out so as to have a larger area, a smaller potential difference can be used to exert an attracting force between the driving electrodes 242A to 242H and the movable section electrodes 52 and between the driving electrodes 242E to 242L and the movable section electrodes 62. This makes it possible to reduce the power consumption of the image pickup apparatus 10 and zoom lens unit 30.

Moreover, compared to the first and second embodiments, the present embodiment does not require the steps 55 or 65. This allows the first and second movable sections 50 and 60 to be machined easily. It is therefore possible to improve the mass productivity of the image pickup apparatus 10 and zoom lens unit 30.

As described above, the present invention can provide a zoom lens unit that hinders the subject from getting out of focus during a zoom operation as well as an image pickup apparatus into which the zoom lens unit is incorporated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A zoom lens unit comprising:

a stator frame;

a first movable section having a first recessed portion and received in the stator frame, which is guided in the stator frame so as to be movable along a predetermined direction;

a second movable section having a second recessed portion and received in the stator frame, which is guided in the stator frame so as to be movable along the predetermined direction independent from a movement of the first movable section;

first and second lenses mounted on the first and second movable sections, respectively, an image of a subject being transferred by the first and second lenses;

first and second substrates arranged in the stator frame so as to be faced each other;

a first holding electrode provided on the first substrate to attract and hold the first movable section;

a second holding electrode provided on the first substrate to attract and hold the second movable section;

first driving electrodes provided on the second substrate at a predetermined pitch in the predetermined direction so as to drive the first movable section, the first driving electrodes being arranged to face the second recessed portion; and second driving electrodes provided on the second substrate at a predetermined pitch in the predetermined direction so as to drive the second movable section, the second driving electrodes being electrically separated from the first driving electrodes and being arranged to face the first recessed portion.

2. The zoom lens unit according to claim 1, wherein the second substrate has a surface including a first central area and a first lateral area, the first central area is defined in a first moving range within which the first movable section is moved, the first lateral area is defined in a second moving range within which the second movable section is moved, the first driving electrodes are arranged in the first central area along the predetermined direction, and the second driving electrodes are arranged in the first lateral area along the predetermined direction.

3. The zoom lens unit according to claim 1, wherein the first substrate has a surface including a second central area and a second lateral area, the second central area is defined in the first moving range within which the first movable section is moved, the second lateral area is defined in the second moving range within which the second movable section is moved, the first holding electrode is extended in the second central area along the predetermined direction, and the second holding electrode is extended in the second lateral area along the predetermined direction.

4. The zoom lens unit according to claim 1, wherein the first and second movable sections are moved to arrange the first and second lenses at predetermined positions in which the first and second lenses forms a zoom lens system having a predetermined zoom ratio.

5. The zoom lens unit according to claim 1, wherein the first driving electrodes are provided at a fixed pitch in the predetermined direction, and the second driving electrodes are provided at a fixed pitch in the predetermined direction.

6. The zoom lens unit according to claim 1, wherein the second substrate has a surface including first and second lateral areas and a first central area between the first and second lateral areas, the first central area is defined in a first moving range within which the first movable section is moved, the first and second lateral areas are defined in a second moving range within which the second movable section is moved, the first driving electrodes are arranged in the first central area along the predetermined direction, the second driving electrodes are arranged in the first and second lateral areas along the predetermined direction.

7. An image pickup apparatus comprising said zoom lens unit according to claim 1.

8. A zoom lens unit comprising:
a stator frame;
a first movable section having a first recessed portion and received in the stator frame, which is guided in the stator frame so as to be movable along a predetermined direction;
a second movable section having a second recessed portion and received in the stator frame, which is guided in the stator frame so as to be movable along the predetermined direction independent from a movement of the first movable section;
first and second lenses mounted on the first and second movable sections, respectively, an image of a subject being transferred by the first and second lenses;
first and second substrates arranged in the stator frame so as to be faced each other;
a first holding electrode provided on the first substrate to attract and hold the second movable section;
a second holding electrode provided on the second substrate to attract and hold the first movable section;
first driving electrodes provided on the second substrate at a predetermined pitch in the predetermined direction so as to drive the second movable section, the first driving electrodes being electrically separated from the second holding electrode and being arranged to face the first recessed portions; and
second driving electrodes provided on the first substrate at a predetermined pitch in the predetermined direction so as to drive the first movable section, the second driving electrodes being electrically separated from the first holding electrodes and being arranged to face the second recessed portions.

9. The zoom lens unit according to claim 8, wherein the first substrate has a surface including a first central area and a first lateral area, a first central area is defined in a first moving range within which the first movable section is moved, the first lateral area is defined in a second moving range within which the second movable section is moved along, the second driving electrodes are arranged in the first central area, and the first holding electrode is arranged in the first lateral area.

10. The zoom lens unit according to claim 8, wherein the second substrate has a surface including a second central area and a second lateral area, the second central area is defined in the second moving range within which the second movable section is moved, the second lateral area is defined in the first moving range within which the first movable section is moved, the first driving electrodes are arranged in the second central area, and the second holding electrode is extended in the second lateral area.

11. The zoom lens unit according to claim 8, wherein the first and second movable sections are moved to arrange the first and second lenses at predetermined positions in which the first and second lenses forms a zoom lens system having a predetermined zoom ratio.

12. The zoom lens unit according to claim 8, wherein the first driving electrodes are provided at a fixed pitch, and the second driving electrodes are provided at a fixed pitch.

13. The zoom lens unit according to claim 8, further comprising:
an another first holding electrode provided on the first substrate to attract and hold the second movable section; and
an another second holding electrode provided on the second substrate to attract and hold the first movable section;
wherein the first substrate has a surface including first and second lateral areas and a first central area between the first and second lateral areas, the first central area is defined in a first moving range within which the first movable section is moved, the first and second lateral areas are defined in a second moving range within which the second movable section is moved, the second driving electrodes are arranged in the first central area along the predetermined direction, the first holding electrodes are arranged in the first and second lateral areas along the predetermined direction, the second substrate has a surface including third and fourth lateral areas and a second central area between the third and fourth lateral areas, the second central area is defined in the second moving range within which the second movable section is moved, the third and fourth lateral areas are defined in the first moving range within which the first movable section is moved, the first driving electrodes are arranged in the second central area along the predetermined direction, the second holding electrodes are arranged in the first and second lateral areas along the predetermined direction.

14. An image pickup apparatus comprising the zoom lens unit according to claim 8.

15. A zoom lens unit comprising:

a stator frame;

a first movable section received in the stator frame, which is guided in the stator frame so as to be movable in a predetermined direction;

a second movable section received in the stator frame, which is guided in the stator frame so as to be movable in the predetermined direction independently of the first movable section;

first and second lenses mounted on the first and second movable sections, respectively, an image of a subject being transferred by the first and second lenses;

first and second substrates arranged in the stator frame so as to be faced each other, the second substrate having a surface including first, second and third areas, the first area is defined in a range within which the first movable section moves, the second area is defined in a range within which the second movable section moves, and the third area is defined between the first and second areas in a range within which the first and second movable sections are movable, respectively;

a first holding electrode provided on the first substrate so as to attract and hold the first movable section;

a second holding electrode provided on the first substrate so as to attract and hold the second movable section, the second holding electrode being electrically separated from the first holding electrode;

first driving electrodes provided in the first area of the second substrate at a predetermined pitch in the predetermined direction so as to drive the first movable section;

second driving electrodes provided in the second area of the second substrate at a predetermined pitch in the predetermined direction so as to drive the second movable section, the second driving electrodes being electrically separated from the first driving electrodes; and third driving electrodes provided in the third area of the second substrate at a predetermined pitch in the predetermined direction so as to selectively drive the first and second movable sections, the third driving electrodes being electrically separated from the first and second driving electrodes.

16. The zoom lens unit according to claim 15, wherein the first substrate has a surface including a first central area and a first lateral area, the first central area is defined in a first moving range within which the first movable section is moved, the first lateral area is defined in a second moving range within which the second movable section is moved, and the first holding electrode is extended in the first central area, and the second holding electrode is extended in the first lateral area.

17. The zoom lens unit according to claim 15, wherein the first and second movable sections are moved to arrange the first and second lenses at predetermined positions in which the first and second lenses forms a zoom lens system having a predetermined zoom ratio.

18. An image pickup apparatus comprising the zoom lens unit according to claim 15.

* * * * *